United States Patent [19]

Safa

[11] Patent Number: 5,598,263
[45] Date of Patent: Jan. 28, 1997

[54] LIGHT-BACKSCATTER MEASUREMENT DEVICE SUITABLE FOR USE ON BOARD A CRAFT

[75] Inventor: Frédéric Safa, Toulouse, France

[73] Assignee: Matra Marconi Space France, Paris, France

[21] Appl. No.: 526,932

[22] Filed: Sep. 12, 1995

[30] Foreign Application Priority Data

Sep. 13, 1994 [FR] France .................................. 94 10905

[51] Int. Cl.⁶ .................................................. G01N 21/47
[52] U.S. Cl. .......................................... 356/342; 359/220
[58] Field of Search .................................... 356/338, 342, 356/4.01, 5.01; 359/220, 198

[56] References Cited

U.S. PATENT DOCUMENTS

| | | | |
|---|---|---|---|
| 4,328,421 | 5/1982 | Falbel | 250/236 |
| 4,340,299 | 6/1982 | Mongeon | 356/28 |
| 4,459,024 | 7/1984 | Gergely | 356/342 |
| 5,071,239 | 12/1991 | Hoffman et al. | 359/728 |
| 5,255,065 | 10/1993 | Schwemmer | 356/5 |
| 5,418,608 | 5/1995 | Caimi et al. | 356/3.01 |

FOREIGN PATENT DOCUMENTS 9010222  9/1991  Germany .

*Primary Examiner*—Richard A. Rosenberger
*Attorney, Agent, or Firm*— Larson and Taylor

[57] ABSTRACT

The device can be used on an aircraft or spacecraft. It comprises a laser for emitting short light pulses, a channel for receiving the backscattered light flux and an optical conical scanner means making it possible to orient a direction common to laser emission and to reception via the channel along successive generatrices of a cone. The scanner has a mirror rotated about a scanning axis for deflecting an optical path common to a receiving detector and to the laser along successive directions distributed at regular angular intervals around the scanning axis and several stationary reflectors distributed at the regular intervals. The reflectors are successively inserted on the common optical path by the rotating mirror. The stationary reflectors correspond to different probing orientations along the cone. The rotating mirror has a size very much less than that of the beam entering and exiting the device.

10 Claims, 3 Drawing Sheets

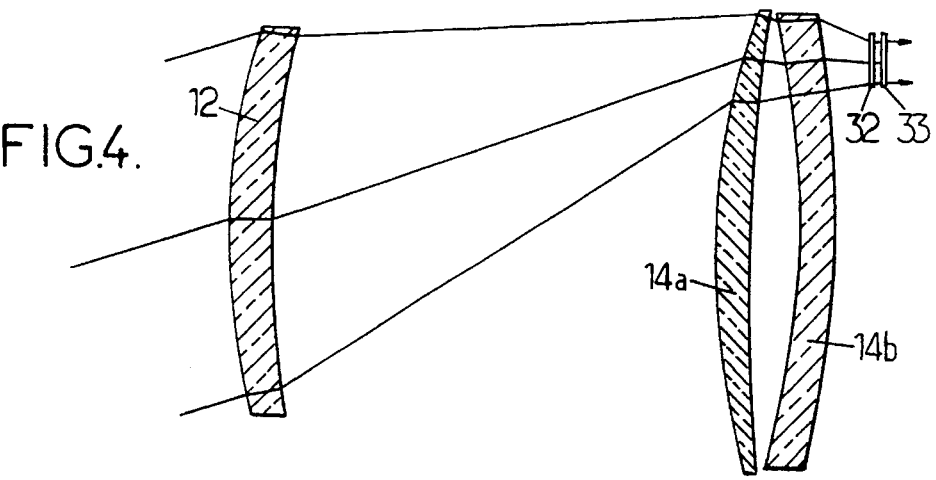
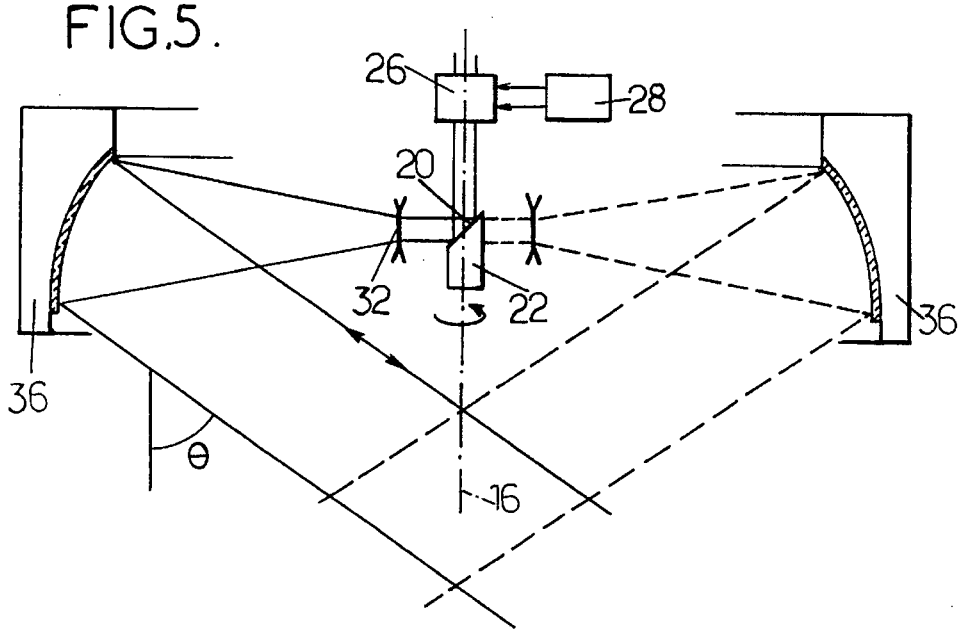
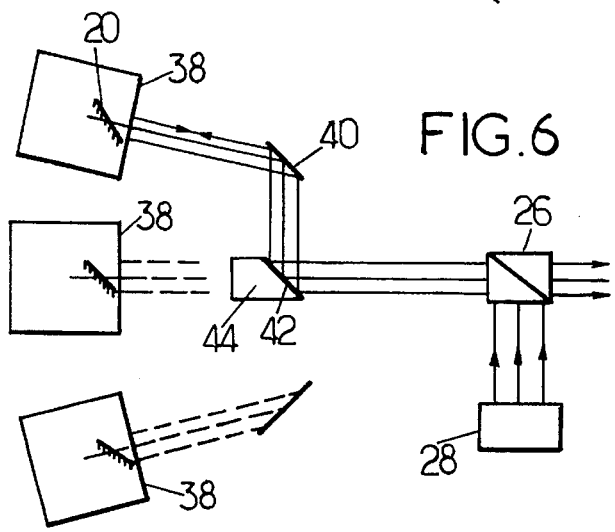
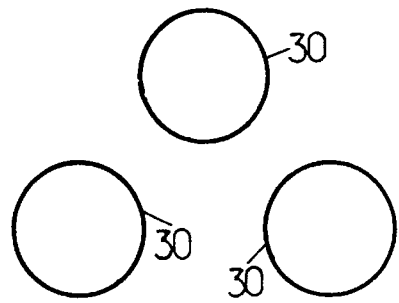

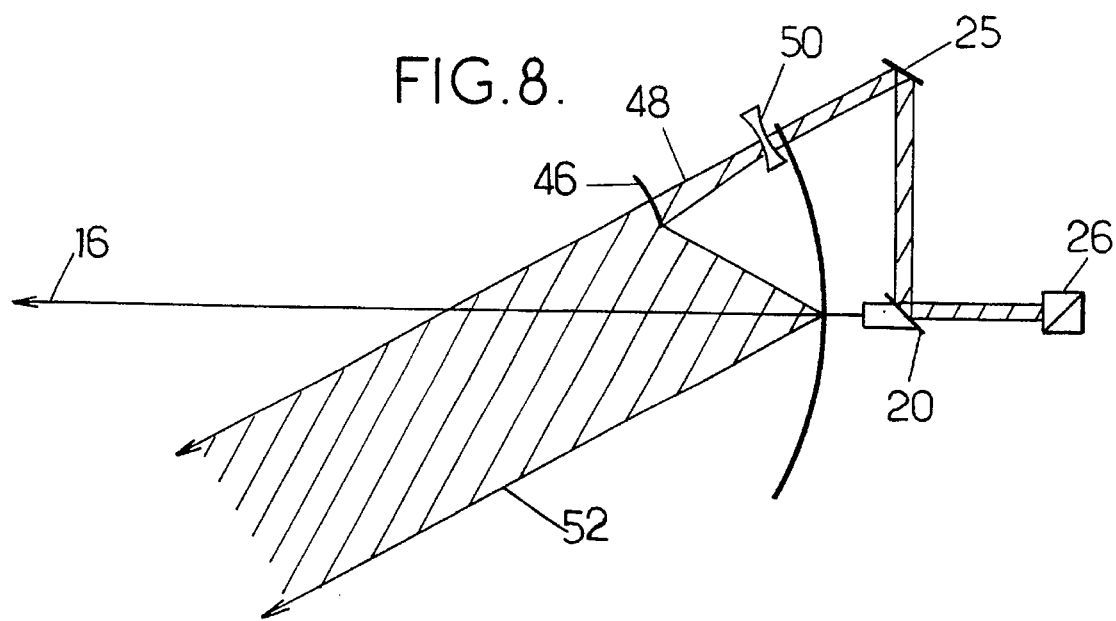

LIGHT-BACKSCATTER MEASUREMENT DEVICE SUITABLE FOR USE ON BOARD A CRAFT

BACKGROUND OF THE INVENTION

The present invention relates to devices suitable for use on board an aircraft or a spacecraft and which are intended to measure the backscattering of the light by a remote scene.

It relates more particularly to the devices of this type, called lidars, comprising a laser for emitting short light pulses, a channel for receiving the backscattered light flux and optical conical scanning means making it possible to orient a direction common to laser emission and to reception via the said channel along successive generatrices of a cone.

An important application of the invention is in the field of lidars on board a satellite and intended for meteorological exploration of the Earth. These lidars emit a laser pulse, of from a few nanoseconds to a few microseconds in length, through a telescope. The wave backscattered by the aerosol particles in the atmosphere makes it possible to measure parameters such as the aerosol concentration or the wind velocity. Since the successive layers in the atmosphere are reached by the laser pulse at different times, splitting the return signal in time slots makes it possible to map the parameters through the thickness of atmosphere probed.

The lidars used may be incoherent: they then just supply information about the variation in the aerosol density as a function of the altitude and about the altitude of the cloud tops, unless the Doppler shift is detected by a spectrometer such as a Fabry-Pérot spectrometer.

More often, coherent lidars or Doppler lidars are used which allow direct measurement of the wind velocity by the Doppler effect and by heterodyne detection, the backscattered wave undergoing a frequency shift proportional to the radial velocity relative to the target. The wind velocity at a given altitude is then obtained by subtracting, from the measured relative radial velocity, the contributions of the speed of the craft carrying the device and of the velocity due to the Earth's rotation.

From a Doppler measurement, only the projection of the velocity vector on the viewing direction of the instrument is obtained. A device of the above kind, for meteorological applications, is consequently advantageously designed to measure at least two components of the velocity, separated by approximately 30°.

Devices of the above kind, mounted on a low-orbit satellite, have already been proposed.

The line of sight of an emitter telescope stationary with respect to the satellite describes a curve over the Earth's surface which reproduces the track of the satellite. In order to obtain good coverage of the Earth, it is necessary that the device probe the atmosphere on either side of the track of the satellite on the ground. To do this, it has been proposed either to move the telescope assembly or to add to the telescope a scanning device located in front of it, such as a flat mirror, providing conical scanning, which corresponds to a cycloid-shaped scanning trace on the ground.

These two known types of scanning have serious drawbacks from the point of view of the mechanical stresses imposed on the satellite's platform. If the telescope is moved in its entirety, it generates reaction forces on the platform, hence stresses and the necessity for compensation in order to maintain attitude control of the satellite. If a mirror or prism is moved in front of the satellite, it must be very large in order to allow a significant aperture.

In practice, this prevents the use of a stepper drive: the telescope or the mirror rotates continuously. This causes two parasitic effects. The backscattered wave is not recovered in the same direction as the transmitted wave, thereby creating an angular aberration phenomenon; since the pulse takes a finite time to pass through the atmosphere, the direction of the return wave varies throughout the duration of the return signal, thereby resulting in blurring.

A telescope with conical scanning has also been proposed [U.S. Pat. No. 5,071,239 to Hoffman et al], comprising an objective, a mirror having a configuration of an ellipsoid ring and a continuously rotating mirror located on the axis of the cone.

SUMMARY OF THE INVENTION

An object of the invention is to provide an improved device of the type defined above. It aims especially to reduce the weight and size of the moving parts necessary for performing the conical scanning.

To this end, there is provided a device wherein the optical means comprise a mirror, rotating stepwise about a scanning axis, for deflecting an optical path common to a receiving detector and to the laser along successive directions distributed at regular angular intervals equal to the step about the scanning axis. It further comprises several stationary reflectors distributed at the said intervals, successively conjugated with the common optical path by the rotating mirror. The stationary reflectors correspond with different probing orientations along the scanning one and the rotating mirror has a size much smaller than that of the beam entering and exiting the device.

The reflectors may typically consist of off-axis portions of paraboloids, each portion focusing a parallel light beam coming from the observed scene to the rotating mirror. These portions of paraboloid thus constitute both reflectors and components of successive telescopes.

In another embodiment, the reflectors are located between an optical lens system, for reducing the diameter of the beam entering and exiting the device, and the rotating mirror. This optical lens system may include a single telescope proper and, for each of the successive viewing directions, an optical correction element which may also be provided to generate a parallel light beam, directed parallel to the axis of rotation of the rotating mirror, having a diameter much less than the diameter of the beam entering and exiting the device.

In order to increase the satellite's coverage, it is possible to multiply the number of tracks on the ground by combining several devices of the kind which has just been defined, with, however, a common detector and a common laser.

The above features, as well as others, will appear more clearer by reading the following description of particular embodiments of the invention, given by way of non-limiting examples. The description refers to the accompanying drawings.

BRIEF DESCRIPTION OF THE DRAWINGS

FIG. 4 shows a specific optical arrangement which can be used in the device of FIG. 3;

FIG. 5, similar to FIG. 3, shows the general construction of a device using a telescope with mirrors;

FIG. 6 shows a device including several telescopes, each of which may be of the kind shown in FIGS. 1, 2 or 5;

FIG. 7 shows a possible arrangement of the exploration fields of three telescopes, using the arrangement of FIG. 6; and FIG. 8, similar to FIG. 1, shows yet another alternative embodiment.

DESCRIPTION OF PREFERRED EMBODIMENTS

Figure 2:
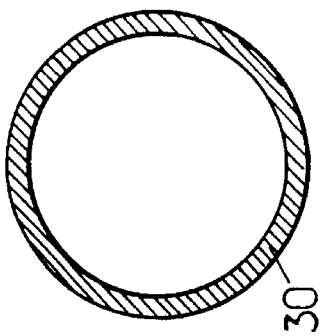
FIG. 2 shows, by the hatching, the form of an annular field explored in the focal plane of the telescope of the device of FIG. 1.
Figure 1:
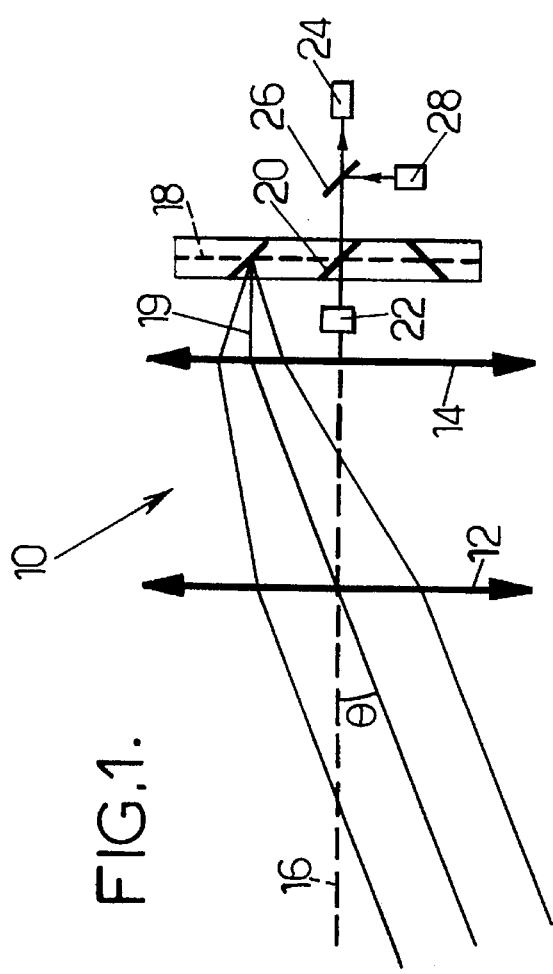
FIG. 1 is a simplified diagram intended to show essential characteristics of the invention.

A principle involved in the invention is shown schematically in FIGS. 1 and 2. The device includes a telescope 10, which is dioptric in the case of FIG. 1 and has an entrance lens or objective 12 and a field lens 14. These lenses are designed so that an incident parallel beam along a direction making an angle of incidence θ with respect to the axis 16 of the telescope (this axis 16 being oriented towards the nadir during use on a satellite) gives rise to a beam converging in a focal plane 18 and having an axis 19 parallel to the telescope optical axis 16 which constitutes the scanning axis. Optical scanning means include a mirror 20, placed on the axis 16, which is much smaller than the entrance beam collected by the lens 12. A stepper motor 22 makes it possible to rotate the mirror 20 step by step about the axis 16.

For each position of the mirror, a particular angular portion of the annular image 30 (FIG. 2), formed in the focal plane and corresponding to the objects supplying an incoming beam at the angle of incidence θ, is sent to a detector 24. A folding mirror 25 corresponds to each possible position of the mirror 20. A splitter 26, represented in FIG. 1 in the form of a semi-transparent plate, makes it possible to send the beam supplied by a pulsed laser 28 along an exit path coinciding with the path of the incoming beam collected by the detector 24.

Because of the low inertia of the mirror 20, it is possible to advance it stepwise, keeping it in the same direction throughout emission and until complete reception of the return echo. The angular aberrations, which scanning at a constant angular velocity would cause, are thus eliminated: the translation movement of the satellite does not in fact cause angular aberrations because of the composition of velocities. In addition, the stepwise operating mode makes it possible to avoid microvibrations which occur when there is a continuous scanning mechanism.

It is relatively easy to build a telescope with lenses which provides a satisfactory image in an annular zone of the focal plane, such as the zone 30 in FIG. 2, possibly by placing a correcting element on each path between the lens 40 and the splitter. There is no chromatic aberration since the wave emitted by the laser 28 is virtually monochromatic. The necessary radial field is narrow, generally of the order of a magnitude of a tenth of a degree.

Figure 3:
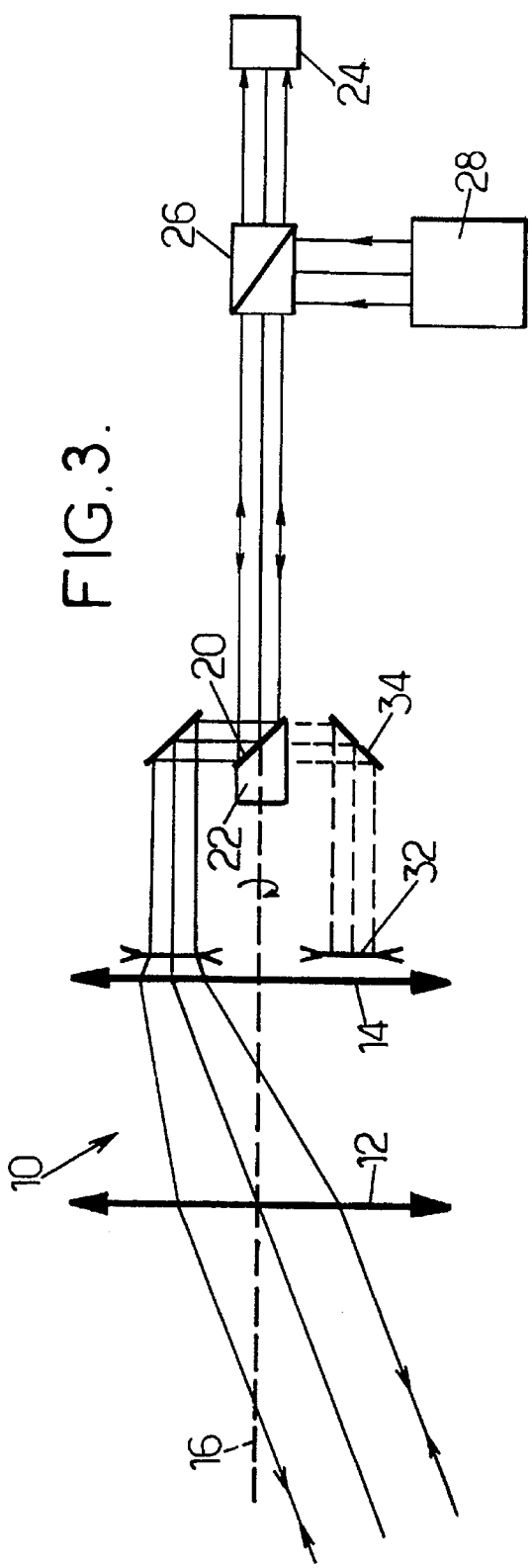
FIG. 3, similar to FIG. 1, shows a possible construction of the device in the case of use of a telescope with lenses.

FIG. 3 shows a possible construction of the device, a simplified representation of which is given in FIG. 1. Corresponding to each angular stoppage position of the mirror 20 is an optical subassembly, comprising a divergent lens 32 supplying an exit beam parallel to the axis 16 and a folding mirror 34 for deflection toward the rotating mirror 20. The lens 32 may be aspherical and constitute a correcting element. It may also be replaced by or supplemented with a correcting element such as a plate having aspherical parallel faces or a holographic element. The splitter 26 may consist of an electrooptic switch.

The entrance aperture diameter of such a device is limited only by the diameter that the lenses 12 and 14 can have. In a device intended to operate in the infrared, and therefore having germanium lenses, it may be difficult to exceed a diameter of 50 cm. The telescope makes it possible to reduce the diameter of the entrance beam by a factor of approximately 10, within an acceptable volume.

For better aberration correction, the telescope may have the construction shown in FIG. 4, with germanium lenses. The single lens 14 of FIG. 2 is replaced by two lenses 14a and 14b having spherical surfaces. The telescope has a focal length of 540 mm, optimized for θ≈20°, with an entrance diameter of 400 mm at this incidence.

The correcting element shown in FIG. 4 includes a divergent lens 32 generating a parallel beam and an aspherical plate 33 which serves to compensate for the residual aberrations.

Neither the laser 28 nor the detector 24, which may have one of well-known constructions, will be described. In the case of a Doppler laser, the velocity measurement will typically be performed by heterodyne detection on the signal supplied by the detector 24.

In practice, a telescope with lenses, as shown in FIG. 3, does not allow a scanning angle θ beyond approximately 45° and an entrance diameter of approximately 50 cm in the infrared. When larger scanning angles and/or entrance diameters are desired, a telescope with angularly distributed mirrors may be used.

FIG. 5 (where the elements corresponding to those of FIG. 3 bear the same reference number) shows the basic construction of such a device. The telescope includes several portions, each having an off-axis parabolic or pseudo-parabolic mirror 36. The number of portions corresponds to the number of successive positions given to the scanning mirror 20 (typically 4 to 20). The successive emission and reception directions all lie along a cone whose vertex angle is defined by the characteristics of the parabolic mirrors 36. A correcting element 32 is again interposed on each optical path, between the rotating mirror 20 and the respective parabolic mirror 36.

The device shown in FIG. 5, like the one in FIG. 3, makes it possible without difficulty to reduce the diameter of the entrance/exit beam in a ratio of approximately 10. It has the advantage of allowing a scanning cone of high vertex half-angle θ, which can easily exceed 45°. In addition, the diameter of the emitted or received beam may easily exceed one meter.

FIGS. 6 and 7 show a system composed of several devices 38 (for example three) which may have one of the constructions described previously, except that they include a common laser 28 and a common detector. The three devices have different orientations so that the tracks of the beam on the ground, assuming that the satellite is stationary, are mutually offset, as shown in FIG. 7. The devices 38 are used in succession; for that the beams coming from their rotating exit mirrors 20 are directed towards the switch 26 via an additional respective deviating mirror 40 and via a rotating mirror 42 which can assume some positions, this rotating mirror being driven by a stepper motor 44.

For some applications, and especially on satellites where the electrical power is limited to approximately 1 kW by the size of the available solar panels and since the power of the laser is also limited, it is desirable that the receiving beam have a width at least equivalent to a circle of 0.5 m in diameter. The embodiment shown in FIG. 8 makes it possible to achieve this result in a limited volume, with a low weight and with elements relatively easy to produce.

The device shown in FIG. 8, in which the elements corresponding to those of FIG. 1 are again designated by the same reference numbers, allows scanning around the axis 16. It includes a spherical mirror 36, the center of curvature C of which is placed on the axis 16. Corresponding to each orientation that the scanning mirror 20 can assume is an optical path in which an aspherical axisymmetric mirror 46, an axisymmetric correcting lens 50, of axis 48, and a deviating element 25, which may be a plane mirror or a prism, are placed. The axis of symmetry 48 of the mirror passes through the point C and constitutes a generatrix of the scanning cone, The optical power and the aperture of each aspherical mirror 46/lens 50 assembly are such that it receives a beam lying between the generatrix 48 of the scanning cone 8 and the radius 52. The mirror 36 is indented around each optical path in order to provide a passage to the light.

As the primary mirror 36 is spherical, it is easy to produce it. It may have a wide aperture, of about F/0.5, thereby reducing the size of the telescope. The mirror 46 and the lens 50 have a rotational symmetry so that they can be made without difficulty by diamond machining. The aspherization of the system 46–50 is designed so as to obtain a stigmatic system for the direction 48 and to satisfy the condition of aplanetism about the direction 48. Since the lidar operates in stepwise mode and the optical parts are stationary during emission and reception of the laser pulse, the field required is virtually zero. In practice, the existence of a non-zero field, in which the telescope is diffraction limited, is useful for aligning the telescope on the ground and for taking into account the in-flight alignment defects of the optics.

A device actually produced comprises a mirror 36 of 1.4 m in diameter and eight to twelve assemblies 46–50 -25 uniformly distributed about the axis 16. Each assembly corresponds to a generatrix 48 and an angular position of the scanning mirror 20.

Such a device for a lidar using a CO2 laser emitting at 9.11 μm wavelength has the following characteristics:
Entrance pupil (beam diameter): 700 mm
Diameter of the mirror 36: 1.420 mm
Number of subassemblies (46, 50, 25): 8
Vertex angle of the scanning cone: 60 degrees
Usable field about to 48 (error<λ/14 rms):
±300 μrad about 48.

I claim:

1. Light backscatter measurement device, comprising:

a laser source for emitting short light pulses along a common path;

a channel for receiving a backscattered light flux along said common path, having a detector, and optical conical scanning means for angularly locating a viewing direction of said device, common to said pulses of light emitted by said laser source and backscattered light returning to said channel, said conical scanning means comprising a mirror, means for rotating said mirror stepwise by successive mutually equal angular intervals about a scanning axis for stopping said mirror in successive angular positions and reflectively diverting said common path to successive diverting paths distributed at said angular intervals and a plurality of stationary reflectors distributed at said angular intervals each on one of said deflected paths, for being successively conjugated with said common optical path by said mirror which has a size much smaller than a size of a beam of said backscattered light flux entering the device from successive viewing directions and reaching said common path and a size of a beam of said light pulses emitted by the laser source and exiting the device.

2. Device according to claim 1, wherein each of said stationary reflectors has a configuration of an off-axis portion of a paraboloid, sized to focus said backscattered light flux originating from a remote scene toward said mirror to constitute a telescope therewith.

3. Device according to claim 1, wherein said stationary reflectors are located between an optical lens system dimensioned for reducing the diameter of a beam of said backscattered light entering the device and said mirror.

4. Device according to claim 3, wherein said optical lens system includes a telescope and an optical correcting element for each said viewing direction.

5. Device according to claim 4, wherein said optical correcting element is arranged for generating a parallel light beam along said common path, parallel to the axis of rotation of the rotating mirror, having a diameter much lesser than the diameter of the beam of said backscattered light flux entering the device.

6. Device according to claim 4, wherein said correcting element is a plate having aspherical parallel surfaces or a holographic element.

7. Device according to claim 1, wherein said optical means are arranged to reduce the diameter of a beam of said bakscattered light entering the device in a ratio of approximately 10/1.

8. Device according to claim 1, mounted on a satellite, further comprising means for continuously directing said scanning axis toward a nadir direction.

9. Device according to claim 1, wherein said reflectors are flat mirrors and are each located on an optical path between:

an optical system for reducing the diameter of the beam of backscattered light, having a spherical mirror common to all said deflected paths, an aspherical correcting mirror and an aspherical lens, and said mirror rotated by successive mutually equal angular intervals.

10. A system for use on board a satellite, comprising a plurality of light backscatter measurement devices, each of said device comprising:

a laser source for emitting short light pulses along a common path;

a channel for receiving a backscattered light flux along said common path, having a detector, and optical conical scanning means for angularly locating a viewing direction of said device common to said pulses of light emitted by said laser source and backscattered light returning to said channel, said conical scanning means comprising a mirror, means for rotating said mirror stepwise by successive mutually equal angular intervals about a scanning axis for stopping said mirror in successive angular positions and reflectively diverting said common path to successive diverting paths distributed at said angular intervals and a plurality of stationary reflectors distributed at said angular intervals each on one of said deflected paths, for being successively conjugated with said common optical path by said mirror which has a size much smaller than a size of a beam of said backscattered light flux entering the device from successive viewing directions and reaching said common path and a size of a beam of said light pulses emitted by the laser source and exiting the device, wherein said devices have different orientations so that tracks of their entrance/exit beams on ground exhibit an offset relative arrangement, said devices being used in succession by orienting said common paths of all said devices to switch means operatively associated with said laser source and with said detector via a respective folding mirror and via an additional mirror having the same plurality of angular positions, said additional rotating mirro being driven by a stepper motor.

* * * * *